United States Patent
Fong et al.

[11] Patent Number: 6,162,285
[45] Date of Patent: *Dec. 19, 2000

[54] OZONE ENHANCEMENT UNIT

[75] Inventors: Gary Fong, Cupertino; Quoc Truong, San Jose, both of Calif.

[73] Assignee: Applied Materials, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,018

[22] Filed: May 8, 1997

[51] Int. Cl.[7] .................................................. B03C 3/016
[52] U.S. Cl. .................................. 96/66; 55/385.6; 96/16; 96/77; 96/88; 96/98; 118/610; 438/723
[58] Field of Search .................................. 96/66, 88, 98, 96/16, 77; 95/78; 118/610

[56] References Cited

U.S. PATENT DOCUMENTS

| | | | |
|---|---|---|---|
| 3,028,864 | 4/1962 | Minto | 96/66 X |
| 3,094,400 | 6/1963 | Blanton | 96/16 |
| 3,228,755 | 1/1966 | Lottinville | 96/66 X |
| 3,798,879 | 3/1974 | Schmidt-Burbach et al. | 96/16 |
| 3,910,778 | 10/1975 | Shahgholi et al. | 96/16 |
| 4,038,049 | 7/1977 | Melcher et al. | 96/77 X |
| 5,055,115 | 10/1991 | Yikai et al. | 96/66 X |
| 5,354,715 | 10/1994 | Wang et al. | 438/723 X |
| 5,376,168 | 12/1994 | Inculet | 96/66 X |
| 5,582,632 | 12/1996 | Nohr et al. | 96/66 X |
| 5,681,374 | 10/1997 | Von Glehn | 96/16 |

FOREIGN PATENT DOCUMENTS

| | | | |
|---|---|---|---|
| 2-48050 | 2/1990 | Japan | 96/66 |
| 717705 | 11/1954 | United Kingdom | 96/16 |
| 1019617 | 2/1966 | United Kingdom | 96/66 |

*Primary Examiner*—Richard L. Chiesa
*Attorney, Agent, or Firm*—Townsend and Townsend & Crew

[57] ABSTRACT

An apparatus for increasing the ozone concentration in the output of an ozone-generating system is disclosed. The invention reduces the concentration of $O^+$ ions, which would otherwise react with ozone to form diatomic oxygen, by means of an ionic filter. In one embodiment, a gas-permeable electrode within a gas conduit attached to the output of an ozonator is negatively charged to several kilovolts with respect to the distribution line. This electrode attracts the positively charged oxygen ions, removing them before they can react with the ozone. This provides a higher ozone concentration that does not vary as much with distance from the ozone generator.

23 Claims, 5 Drawing Sheets

OZONE ENHANCEMENT UNIT

BACKGROUND OF THE INVENTION

The present invention relates to the generation of ozone. More particularly, the invention provides a technique, including a method and an apparatus, for removing oxygen ions ($O^+$) from an ozone flow, thus increasing the concentration of ozone delivered from an ozone generator to a reaction zone.

Ozone ($O_3$) is a gaseous allotrope of oxygen derived or formed naturally from diatomic oxygen ($O_2$) by electric discharge or exposure to ultraviolet light. Ozone is relatively unstable compared with $O_2$ and is used extensively to purify air and sterilize water. Because ozone is unstable, it is also useful as an oxidizer, typically reacting at a lower temperature (activation energy) than $O_2$ does in a similar reaction. One example where ozone is used as an oxidizer is in a chemical vapor deposition (CVD) reaction that uses ozone with an organosilane compound, such as tetraethoxysilane (TEOS). The use of ozone allows a layer of silicon dioxide to be deposited on a substrate at a relatively low temperature.

The concentration of ozone may not be critical in some applications, such as water sterilization; however, it is generally desirable to carefully control the ozone concentration in a CVD process. Ozone may be used in a CVD process to fabricate integrated circuits on a semiconductor wafer. For example, ozone and TEOS may be flown into a CVD reaction chamber to form a layer of silicon dioxide. Integrated circuits often have very small surface features, perhaps less than 1 μm in height or width, and fabricating these devices requires careful process controls to ensure high yields. Having a constant, repeatable flow of ozone is important for process control because the ozone concentration is usually matched to a corresponding flow of the reactant gas.

It is also desirable to use a relatively high ozone concentration in some CVD processes. Higher ozone concentrations allow higher flows of corresponding reactant gas which in turn result in a faster deposition rate. The faster deposition rate reduces the time required to deposit a layer of a given thickness, improving efficiency of the CVD process and lowering costs of the resultant wafer. Merely increasing the total output of an ozonator, by increasing the flow through the ozonator, for example, may not solve this problem because the concentration of ozone, rather than total available ozone, may determine the rate of deposition.

Processes requiring ozone obtain the necessary ozone from an ozone generator, or ozonator. The ozonator typically uses electric discharge to produce ozone from $O_2$. The efficiency of the ozonator depends on many factors, and typically produces $O^+$ ions, along with the ozone and other molecules and ions. The $O^+$ ions can react with the ozone to form diatomic oxygen, which not only reduces the efficiency of the ozonator, but can cause the concentration of ozone to decrease, depending on how long the $O^+$ ions remain in contact with the $O_3$.

Various methods are used for increasing the output concentration of ozone from an ozonator. One method injects nitrogen ($N_2$) gas into the input stream of oxygen to the ozonator. It is believed the ozonator produces nitrogen ions, which scavenge the $O^+$ ions to form a nitrous oxide of the general family $NO_x$. For example, in one known system, adding 0.1% $N_2$ to the $O_2$ at the input to the ozonator increases the ozone concentration at the ozonator output by over 1.5 weight-percent.

FIG. 1 shows a diagram of part of a CVD system that uses ozone from an ozonator with nitrogen injection. A nitrogen source 103 injects $N_2$ into a flow of $O_2$ from an oxygen source 102, which flows into an ozonator 101. The ozonator 101 converts some of the $O_2$ to $O_3$, which flows through an ozone delivery line 105 into a CVD chamber 106. The flow of gases from the ozone delivery line 105 into the chamber 106 is controlled by a mass flow controller (MFC) 107.

The addition of nitrogen improves ozonator performance, but some of the resultant compounds, for example nitrous oxides, may create problems. For example, the nitrous oxides may combine with ambient moisture to form nitric acid, which can attack components of the ozonator and cause other problems. Therefore, it is desirable to increase and stabilize the concentration of ozone from an ozonator while reducing the concentration of nitrous oxide compounds associated with present schemes.

SUMMARY OF THE INVENTION

The present invention provides apparatus and methods for reducing the concentration of charged ions in a flow of ozone. A device according to one embodiment of the present invention includes an electrode within a vessel chamber that defines a gas conduit. The electrode may be charged to an electric potential with a voltage supply such that oppositely charged ions within a flow of ozone adjacent to a surface of the electrode are attracted to the electrode and are thus removed from the flow of ozone. Removing $O^+$ ions from a flow of ozone improves the concentration of ozone by reducing the recombination of $O^+$ ions and ozone to form diatomic oxygen.

For a further understanding of the objects and advantages of the present invention, reference should be made to the ensuing detailed description taken in conjunction with the accompanying drawings.

DESCRIPTION OF SPECIFIC EMBODIMENTS

An ozone generator produces ozone from diatomic oxygen, usually by means of electric discharge. The ozone output concentration, typically expressed as a weight-percent in oxygen, may vary due to the presence of oxygen ions, which combine with ozone to form diatomic oxygen. The in-line ion filter of the present invention provides a higher and more consistent concentration of ozone delivered, for example, to a reaction zone in a processing chamber.

Figure 1:
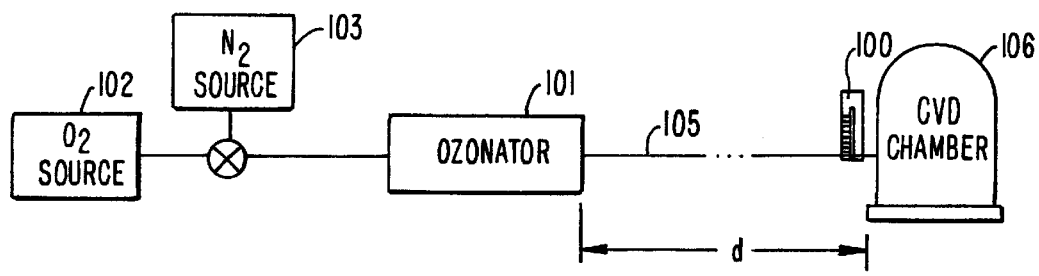
FIG. 1 is a diagram showing the arrangement of a prior-art ozonator connected to a CVD reaction chamber.
Figure 2:
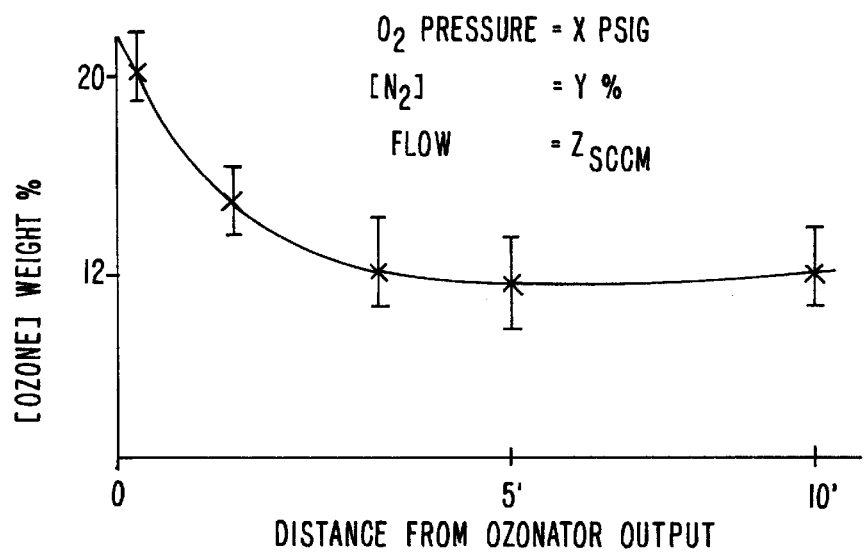
FIG. 2 is a graph showing the ozone concentration versus distance from the ozonator output in a laboratory system designed to reproduce the conditions expected in a system as depicted in FIG. 1.

FIG. 2 shows the ozone concentration from an ozonator versus distance from the output of the ozonator. The data was obtained from a laboratory system designed to reproduce the ozone concentration versus distance from the ozonator that would arise in a processing system as shown in FIG. 1. Output tubes of varying lengths were attached to an ozonator and the ozone concentration was measured at the end of each output tube. The output tubes were bent to reproduce the bends anticipated in the ozone delivery line of a processing system. Because ozone reacts quickly with $O^+$ ions, most of the decline in ozone concentration occurs in the first five feet of the ozone delivery line 105. This decline in ozone concentration suggests that the $O^+$ ions are not being effectively scavenged by the nitrogen ions, allowing $O^+$ ions to remain in contact and react with the ozone. Removing the $O^+$ ions before they have a chance to react with the ozone would increase the concentration of ozone delivered to the CVD chamber. Additionally, removing $O^+$ ions by some means other than nitrogen scavenging may allow a reduction in the injection of $N_2$ into the ozonator, and therefore reduce the formation of nitrous oxides and acids.

Figure 3:
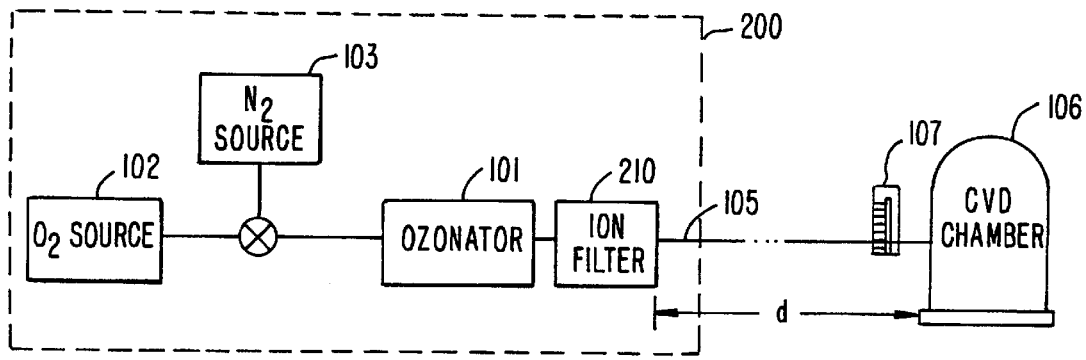
FIG. 3 is a diagram of one embodiment of an ozonator connected to a CVD reaction chamber with an ion filter attached near the output of the ozonator.

FIG. 3 is a diagram of one embodiment of an ozone delivery system 200 according to the present invention. In FIG. 3, an ozone generator, or ozonator, 101 receives input gases from an oxygen source 102, and a nitrogen source 103. The ozonator operates at about 30–35 psig, and the flow through the ozonator and into the chamber is controlled by an MFC 107 further down the ozone delivery line 105, closer to the chamber 106. It is desirable to have MFC 107 close to the chamber to minimize the effect on flow into the chamber due to the resistance in the ozone delivery line 105. In some systems, the resistance to flow can be appreciable because the distance (shown as d) between CVD chamber 106 and ozone delivery system 200 can be 30 feet or more. The chamber 106 may be used, for example, to deposit silicon dioxide onto a semiconductor wafer (not shown) using a combination of ozone and TEOS in a CVD process. The ozone delivery line 105 carries ozone from the ozonator 101 and an ion filter 210 to the chamber 106. The in-line ion filter 210 is attached to the output of the ozonator 101.

Figure 4A:
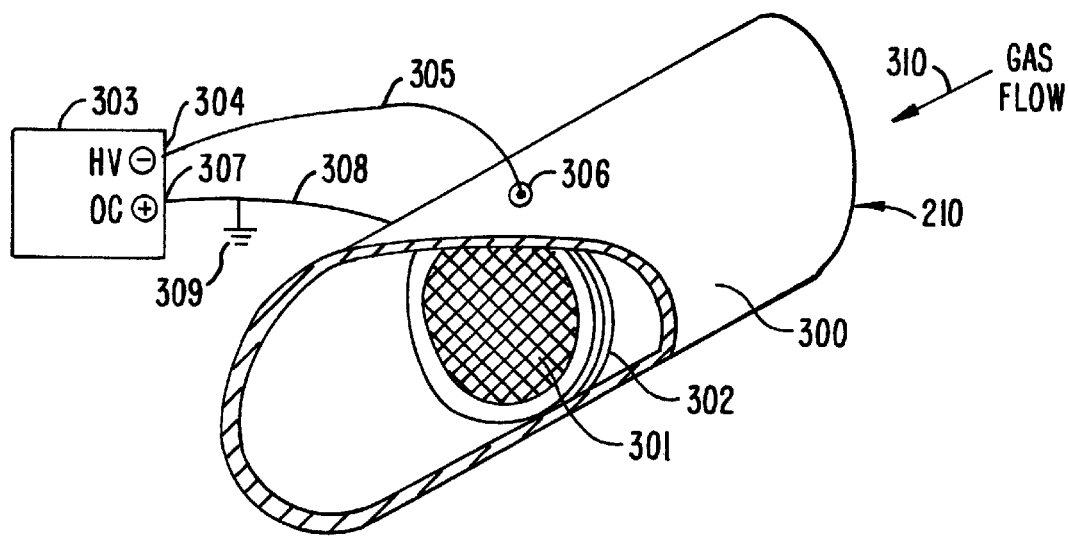
FIG. 4A is a partially cut-away view of one embodiment of an ion filter using stainless steel tubing and a metal mesh electrode.

FIG. 4A is a partial cut-away view of one embodiment of the ion filter 210 utilizing a wire-mesh disk 301. The ion filter 210 has a vessel chamber 300, that acts as a conduit for the output flow from the ozonator (not shown in this view). Gas flows through the vessel chamber 300 and the wire-mesh disk 301 as indicated by an arrow 310. The direction of gas flow is arbitrary, as is the cross-sectional shape of the vessel chamber 300, which may be square, round, or other shape. An electrical power supply 303 establishes a potential between the wire-mesh disk 301 and the vessel chamber 300, which act as a pair of oppositely charged electrodes. Positive ions are attracted to the negatively charged electrode, and negative ions to the positive electrode. Ions other than $O^+$ ions may be produced in the ozonator and may be undesirable in the ozone flow. Removing these ions, such as the negative ions, may result in a higher ozone concentration.

Even though a CVD system may have an MFC (not shown in this view) downstream of the ion filter 210, the filter must not unduly impede the flow of gas at the operating pressure of the ozonator. The flow through the ion filter at the operating pressure of the ozonator should be sufficient to meet the process requirements of any reaction contemplated in the CVD chamber (not shown in this view). Therefore, the wire-mesh disk 301 must be reasonably gas-permeable. Additionally, the wire-mesh disk 301 is made preferably from a material that is resistant to attack by the ozone and by the by-products of the ozonator, such as nitric acid. In one preferred embodiment, the wire-mesh disk 301 is fabricated from stainless steel or nickel mesh having 20 squares per inch.

The wire-mesh disk 301 is electrically isolated from the vessel chamber 300 by an isolator 302. The power supply 303 produces a high-voltage direct current (DC) potential of between about 5 and 30 kV, preferably about 10 kV. Because the $O^+$ ions are positively charged, they will be attracted to a negative potential. Therefore, in this embodiment the negative terminal 304 is connected to wire-mesh disk 301 via a high-tension wire 305, through a gas-tight insulating feedthrough 306. This ensures that most of the ozone to be filtered of $O^+$ ions passes through the negatively charged mesh.

In this embodiment, the vessel chamber 300 is made from a conductive material, such as stainless steel, that is resistant to attack from ozone and ozonator by-products. In one embodiment, vessel chamber 300 is approximately one inch in diameter, and has ends (not shown) that form a gas-tight seal with the ozone delivery line (not shown in this view) and the ozonator (not shown in this view). The vessel chamber 300 is connected to the positive terminal 307 of the power supply 303 with a ground wire 308, which is connected to ground potential 309. With the wire-mesh disk 301 acting as the negative electrode in the system, the vessel chamber 300 acts as the positive electrode. However, the ion filter would work in the opposite polarity, as well. An ionic current may flow between the conductive vessel chamber 300 and the wire-mesh disk 301 if negative ions are attracted to the vessel chamber 300 as positive ions are attracted to the wire-mesh disk 301. This ionic current reduces the charge build-up on the wire-mesh disk 301.

Figure 4B:
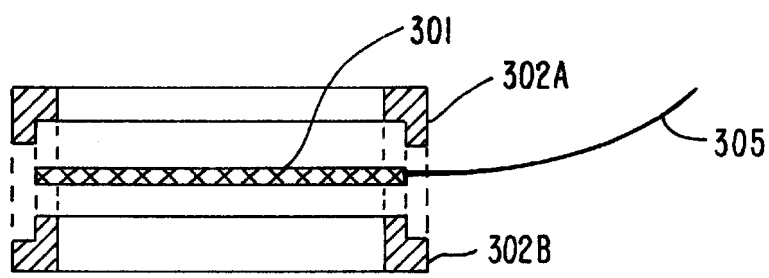
FIG. 4B is a cross-section of one embodiment of a mesh holder and electrical isolator.

An isolator 302 keeps the wire-mesh disk 301 from forming a short circuit with the vessel chamber 300, and therefore is made from a nonconductive material, such as polytetrafluoroethylene, commercially available under the name TEFLON from E.I. du Pont de Nemours and Co., or ceramic, such as alumina or aluminum nitride, that is resistant to attack from ozone and ozonator by-products. FIG. 4B shows an exploded cut-away side view of one embodiment of the isolator 302. An upper shell 302A mates with a lower shell 302B to hold the wire-mesh disk 301.

Figure 4C:
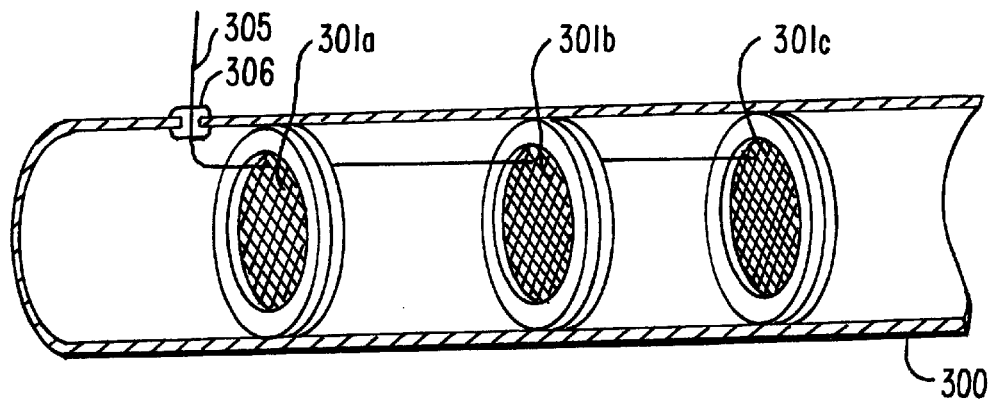
FIG. 4C is a cut-away view of one embodiment of the invention incorporating several electrodes in series.

FIG. 4C shows another embodiment of the invention where the electrode is comprised of several members. Wire-mesh disks 301a–c, forming the members of the electrode, are stacked in series in vessel chamber 300. Each wire-mesh disk removes a portion of the $O^+$ ion concentration and thereby increases the overall efficiency of the ion filter. The high-tension wire 305 enters through a single feedthrough 306 to connect wire-mesh disks 301a–c in parallel within vessel chamber 300. Alternatively, each disk could have a separate high tension wire attached through a separate feedthrough.

The optimum number of electrode members depends on many factors, and may be greater than the example of three disks shown in FIG. 4C. Ozonator output products, operating pressure and temperature, gas flow rate, power supply voltage, mesh size, and desired ozone concentration, among other factors, contribute to the choice for the optimum number of members.

Figure 5:
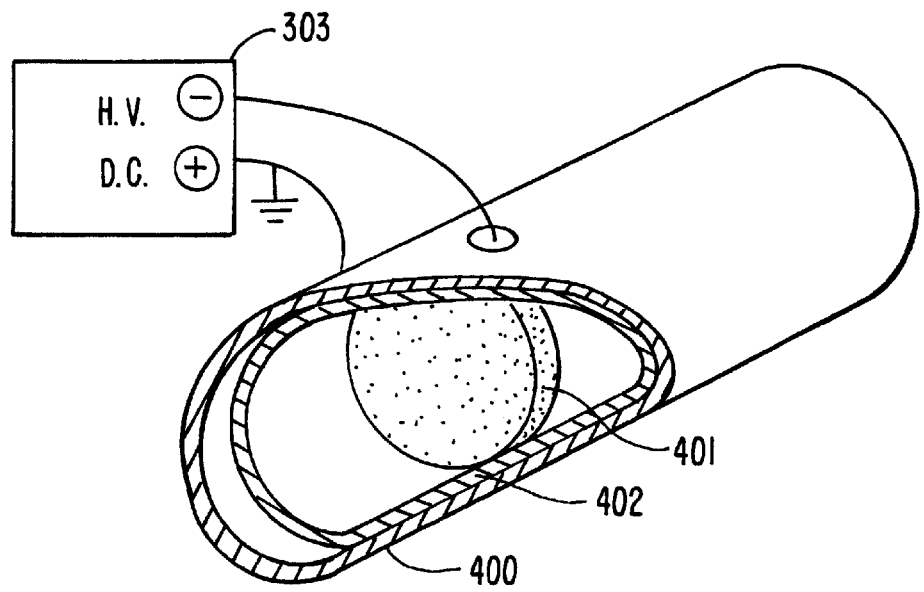
FIG. 5. is a schematic of one embodiment of an ion filter using lined tubing and a sintered powder-metal electrode.

FIG. 5 shows a partial cut-away view of another embodiment of the invention. A porous conductive disk 401 lies inside a vessel chamber 400, which is lined with a sleeve 402. The porous conductive disk 401 may be sintered from powdered metal, or fabricated out of metal wool, for example. The sleeve 402 is made of an ozone-resistant, electrically insulating material, such as TEFLON or ceramic, and protects the vessel chamber 400 from corrosion, as well as electrically insulating the porous conductive disk 401 from the vessel chamber 400. This allows the vessel chamber 400, which is electrically conductive, to be fabricated from materials that may otherwise react with the ozonator output products. The sleeve 402 must be thick enough so that dielectric breakdown of the sleeve material does not occur at the operating voltage of the power supply 303. Although the sleeve 402 may prevent an ionic current from flowing between the conductive disk 401 and the vessel chamber 400, charge build-up on the conductive disk 401 may be reduced in at least two ways. First, the $O^+$ ions attracted to the conductive disk 401 may react to form $O_2$, cancelling the charge from two ions for each molecule formed. Second, the conductive disk may trap $O^+$ ions during the period when ozone is being produced. If ozone is not needed during a period of time, the polarity of the conductive disk may be reversed, and the $O^+$ ions evacuated or purged from the ion filter, thus eliminating the built-up charge and refreshing the ion filter. Both of these charge-reducing mechanisms may also apply to the embodiments described above.

Figure 6:
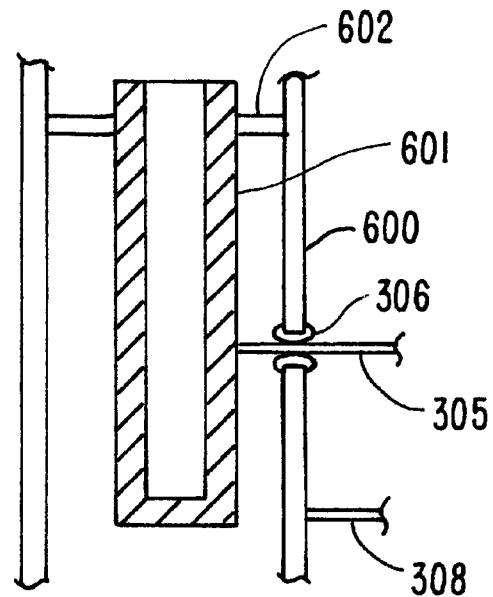
FIG. 6 is a cross-sectional view of one embodiment of the invention using a basket-shaped electrode.

FIG. 6 is a cut-away view of an embodiment where a gas-permeable electrode 601 is coaxial with a vessel chamber 600. Isolator 602 further acts as a barrier to direct gas flow through the gas-permeable electrode 601. The direction of flow 310 is arbitrary.

Figure 7:
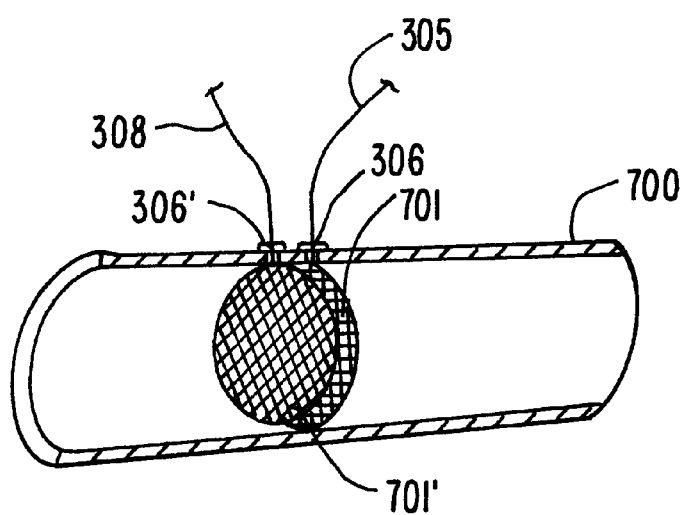
FIG. 7 is a cut-away view of one embodiment of the invention using a pair of gas-permeable electrodes of opposite polarity in series.

FIG. 7 shows an embodiment where a conduit 700 is made of a nonconducting material and contains an electrode pair 701 and 701'. A negative electrode 701 is shown in series with a positive electrode 701'. Any mobile ions between this pair will be attracted toward one electrode or the other as long as a voltage is applied between the electrode pair. The complementary electrodes in this embodiment may take other shapes, including coaxial, as discussed above, and additional electrodes may be included, as in a serial stack of electrodes.

Referring to FIG. 2, it is more efficient to place the ion filter close to the output of the ozonator because such a placement allows the filter to remove more ions. Similarly, a shorter ion filter may be more efficient because a shorter filter may remove more ions before they have a chance to react with the ozone. A short filter may have the additional advantage of being able to fit within existing ozone systems near the ozonator output. Therefore, a compact design is desirable.

Figure 8:
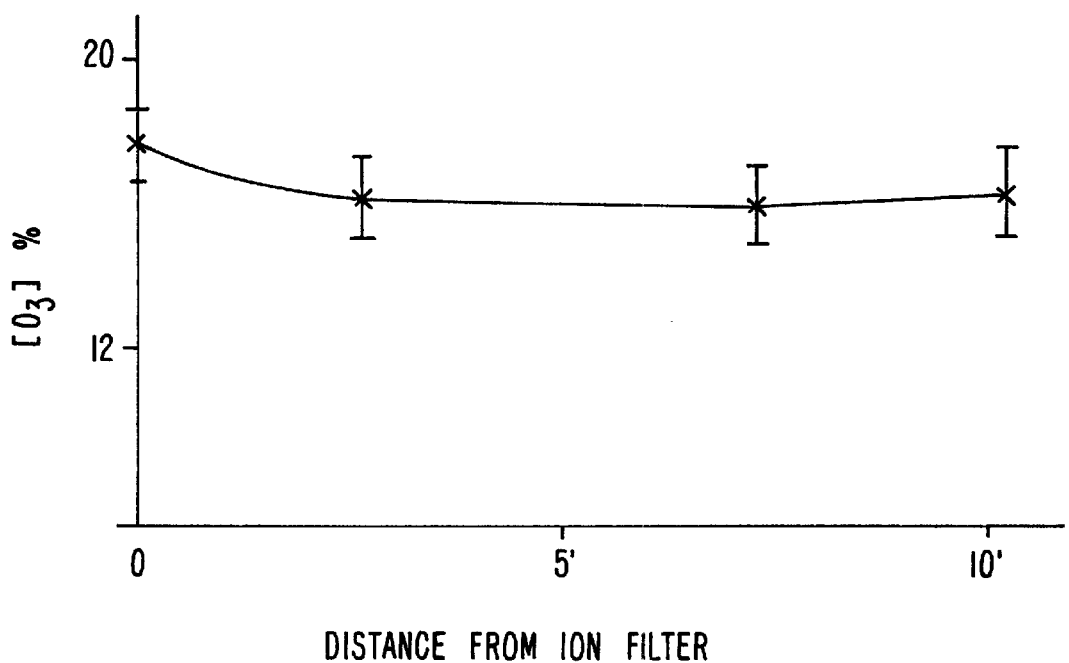
FIG. 8 is a graph showing the ozone concentration versus distance from an ozonator output according to an embodiment of the present invention.

FIG. 8 shows the ozone concentration, as a weight-percent of the total gas composition, versus distance from the ion filter in a system such as that shown in FIG. 3. Comparing these results with those shown in FIG. 2 shows that a higher ozone concentration is achieved with the present invention. Use of the ion filter provides a high concentration of ozone and may eliminate the need for injecting nitrogen into the ozonator in some applications.

Having fully described embodiments of the present invention incorporating gas-permeable electrodes, other equivalent or alternative methods of reducing the $O^+$ ion concentration from ozone according to the present invention will be apparent to those skilled in the art. For example, an electrode or electrodes that are coaxial with the vessel chamber, such as a wire or wires running through the vessel chamber, may reduce the ion concentration in a flow of ozone. A wire or wires stretched across the flow of the ozone may also serve as an electrode, or other materials may be used to fabricate a gas-permeable electrode, such as a metallized ceramic or glass. In another example, the isolator or liner may be made of glass. These and other equivalents and alternatives are intended to be included within the scope of the present invention.

What is claimed is:

1. An ozone supplying apparatus disposed upstream of a processing chamber for supplying a flow of ozone ($O_3$) to the processing chamber, the apparatus comprising:

an ozonator for producing a flow of ozone ($O_3$) from $O_2$, the flow of ozone including positive ions;

a positively charged gas conduit coupled with the ozonator for receiving the flow of ozone, the gas conduit having no substrate support therein; and a negatively charged electrode disposed in the gas conduit for removing the positive ions from the flow of ozone.

2. The ozone supplying apparatus of claim 2 wherein the electrode is gas-permeable.

3. The ozone supplying apparatus of claim 2 wherein the electrode comprises stainless steel wire mesh or nickel wire mesh, powdered metal, or metal wool.

4. The ozone supplying apparatus of claim 1 wherein the positive ions comprise $O^+$ ions.

5. The ozone supplying apparatus of claim 1 wherein the gas conduit is disposed upstream of a processing chamber.

6. The ozone supplying apparatus of claim 1 wherein the gas conduit is electrically conductive.

7. The ozone supplying apparatus of claim 6 wherein the gas conduit comprises stainless steel or nickel tubing.

8. The ozone supplying apparatus of claim 6 further comprising an isolator providing electrical isolation between the electrode and the gas conduit.

9. The ozone supplying apparatus of claim 8 wherein the isolator comprises polytetrafluoroethylene or ceramic.

10. The ozone supplying apparatus of claim 1 further comprising a voltage supply coupled between the gas conduit and the electrode.

11. The ozone supplying apparatus of claim 1 further comprising a mass flow controller coupled to the gas conduit for controlling the flow of ozone.

12. An apparatus disposed upstream of a processing chamber for supplying a flow of ozone ($O_3$) to the processing chamber, the apparatus comprising:

an ozonator for providing a flow of ozone;

an electrically conductive gas conduit coupled with the ozonator for receiving the flow of ozone and supplying the flow of ozone to the processing chamber, the electrically conductive gas conduit having no substrate support therein;

an electrode disposed in the gas conduit; and a voltage supply coupled between the electrically conductive gas conduit and the electrode for establishing a potential between the electrically conductive gas conduit and the electrode, one of the electrically conductive gas conduit and the electrode being positively charged for attracting negative ions, the other of the electrically conductive gas conduit and the electrode being negatively charged for attracting positive ions.

13. The apparatus of claim 12 wherein the electrode is gas-permeable.

14. The apparatus of claim 12 further comprising an isolator disposed between the electrode and the electrically conductive gas conduit.

15. The apparatus of claim 14 wherein the isolator comprises an electrically nonconductive material electrically isolating the electrode from the electrically conductive gas conduit.

16. The apparatus of claim 12 wherein the voltage supply produces a voltage of between about 5–30 kV DC for establishing a potential between the electrically conductive gas conduit and the electrode.

17. The apparatus of claim 16 further comprising an electrical isolator disposed between the electrode and the electrically conductive gas conduit to provide at least about 5 kV of isolation therebetween.

18. An ozone supplying apparatus disposed upstream of a processing chamber for supplying a flow of ozone ($O_3$) to the processing chamber, the apparatus comprising:

an ozonator for producing a flow of ozone ($O_3$) from $O_2$, the flow of ozone including $O^+$ ions;

an electrically conductive gas conduit coupled with the ozonator for receiving the flow of ozone, the gas conduit having no substrate support therein;

an electrode disposed in the electrically conductive gas conduit; and an electrical isolator disposed between the electrically conductive gas conduit and the electrode;

wherein one of the electrically conductive gas conduit and the electrode is negatively charged for removing the $O^+$ ions from the flow of ozone.

19. The ozone supplying apparatus of claim 18 wherein the electrode is negatively charged and gas permeable.

20. The ozone supplying apparatus of claim 18 wherein the electrode is negatively charged and the electrically conductive gas conduit is positively charged.

21. An ozone supplying apparatus disposed upstream of a processing chamber for supplying a flow of ozone ($O_3$) to the processing chamber, the apparatus comprising:

an ozonator for producing from $O_2$ a flow of ozone ($O_3$) which includes positive ions;

an electrically conductive gas conduit coupled with the ozonator for receiving the flow of ozone, the gas conduit having no substrate support therein;

an electrode disposed inside the electrically conductive gas conduit; and means for establishing a potential between the electrically conductive gas conduit and the electrode, to negatively charge one of the electrically conductive gas conduit and the electrode for removing the positive ions from the flow of ozone to produce a flow of ozone with a reduced amount of positive ions and to positively charge the other of the electrically conductive gas conduit and the electrode for attracting negative ions.

22. The ozone supplying apparatus of claim 21 wherein the means comprises means for removing $O^+$ ions from the flow of ozone.

23. The ozone supplying apparatus of claim 22 further comprising means for directing the flow of ozone with a reduced amount of $O^+$ ions to the processing chamber.

* * * * *